May 31, 1932.  C. E. SUNDBERG  1,860,371

TIME SWITCH

Filed April 1, 1929  3 Sheets-Sheet 1

INVENTOR.
Carl E. Sundberg
Jas. H. Churchill
Atty.

May 31, 1932.   C. E. SUNDBERG   1,860,371
TIME SWITCH
Filed April 1, 1929   3 Sheets-Sheet 2

INVENTOR.
Carl E. Sundberg
by Jas. H. Churchill
atty.

May 31, 1932. C. E. SUNDBERG 1,860,371
TIME SWITCH
Filed April 1, 1929 3 Sheets-Sheet 3

INVENTOR.
Carl E. Sundberg
Jas. H. Churchill
Atty.

Patented May 31, 1932

1,860,371

UNITED STATES PATENT OFFICE

CARL E. SUNDBERG, OF QUINCY, MASSACHUSETTS, ASSIGNOR TO ALBERT & J. M. ANDERSON MANUFACTURING COMPANY, OF SOUTH BOSTON, MASSACHUSETTS, A CORPORATION OF MASSACHUSETTS

TIME SWITCH

Application filed April 1, 1929. Serial No. 351,699.

This invention relates to apparatus of that character in which a movable member is moved into its operative and inoperative positions by a spring or other mechanical motor, whose action is controlled by a time element continuously driven by a synchronous electric motor.

Apparatus of this character may be used for controlling the flow of electric currents, gas, water, or other fluids, and will be hereinafter referred to as a time switch.

The present invention has for its object to provide a superior time switch of the character described in which a spring motor of any desired strength or power within limits may be used to intermittently operate the movable member of the switch and to be rewound intermittently independently of the synchronous electric motor and while the latter is running continuously.

Provision is also made for reducing to a minimum the amount of work required of the synchronous motor whereby a small synchronous motor may be used in a time switch having a relatively powerful spring motor capable of handling switch members used in circuits carrying currents of relatively large amperage.

To these ends, the relatively powerful spring motor has one end operatively connected with the movable member of the switch, and its other end operatively connected with an electric motor, which latter is intermittently operated to intermittently rewind the spring motor, and whose action is responsive to the condition of the spring motor, as will be described.

The action of the spring motor upon the movable member of the switch, is controlled by a time element which is operatively connected with the synchronous electric motor to be continuously rotated by the latter in definite time relation thereto, and which is independent of and does not react upon the spring motor.

Provison is made for manually rotating the time element for a purpose as will be described.

These and other features of this invention will be pointed out in the claims at the end of this specification.

Figure 1:
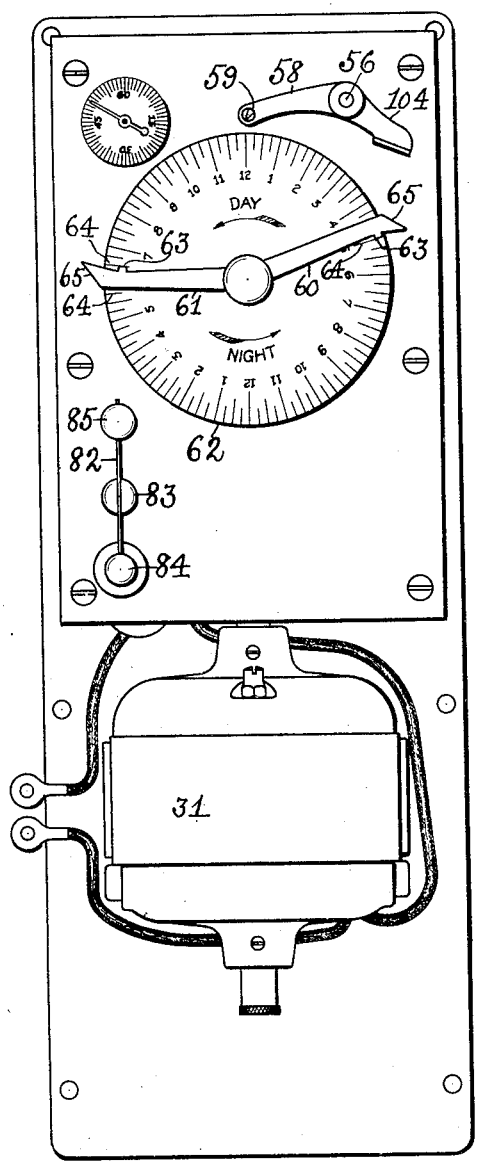
Figure 2:
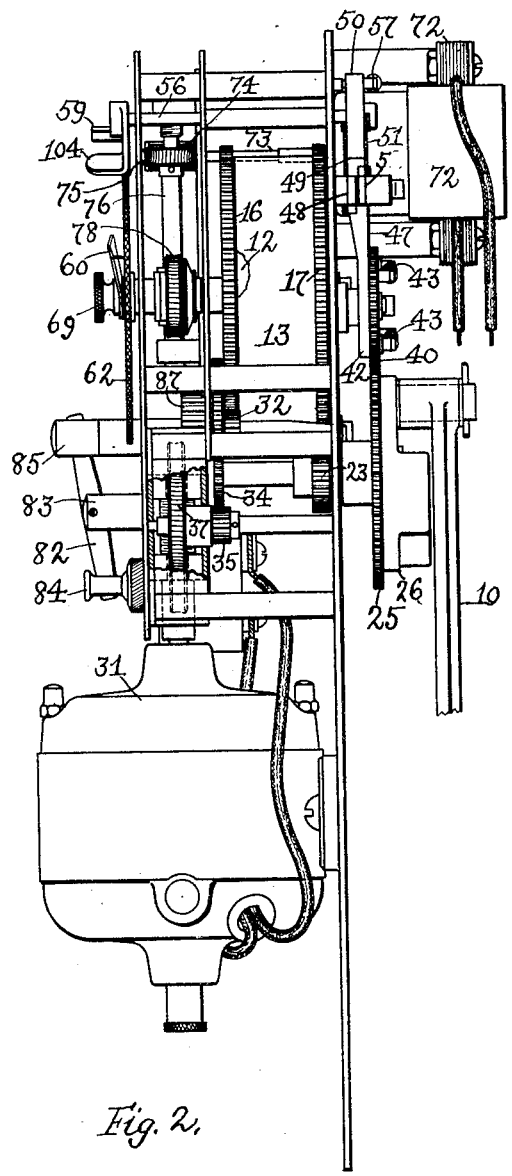
Figure 6:
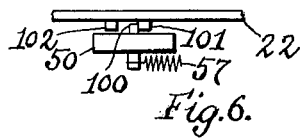
Figure 4:
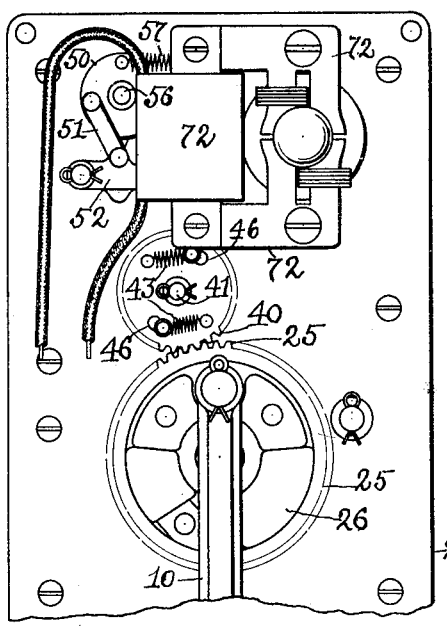
Figure 3:
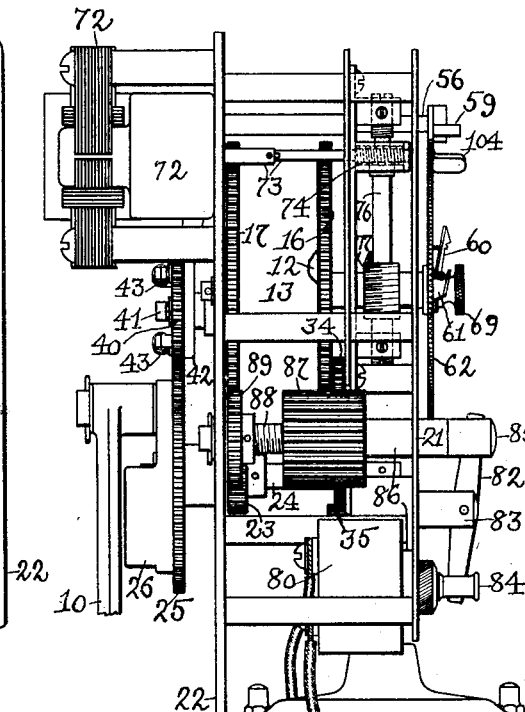
Figure 5:
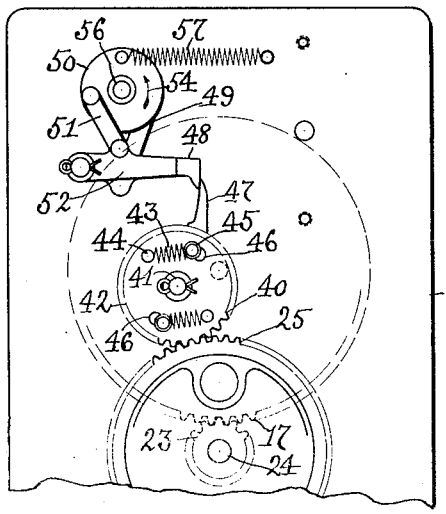
Figure 11:
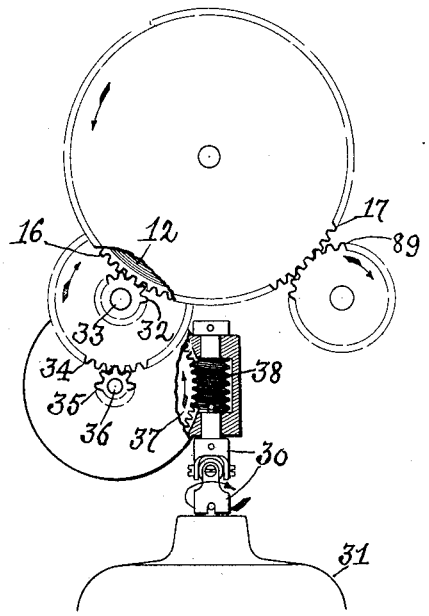
Figure 7:
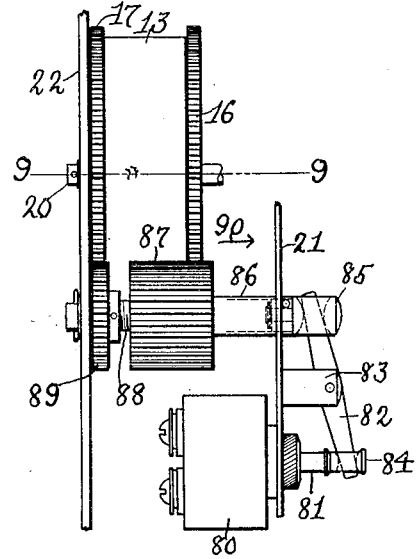
Figure 8:
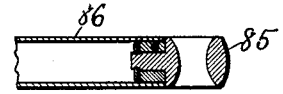
Figure 10:
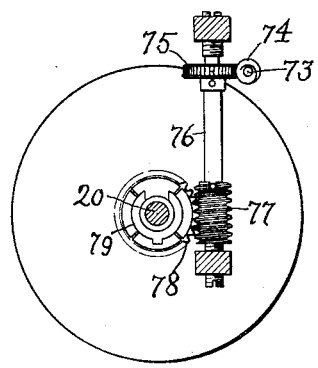
Figure 9:
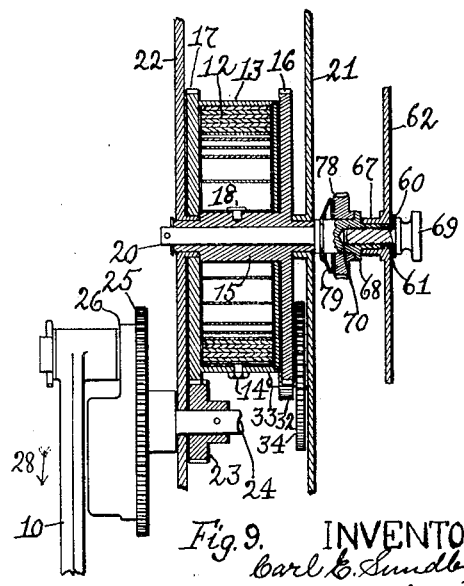

Fig. 1 is a front elevation of a time switch embodying this invention;

Fig. 2, a side elevation of the time switch shown in Fig. 1, looking toward the left;

Fig. 3, a side elevation looking toward the right in Fig. 1;

Fig. 4, a rear elevation of the upper portion of the time switch looking toward the right in Fig. 3;

Fig. 5, an elevation like Fig. 4, with the synchronous motor omitted;

Fig. 6, a detail in plan of a portion of the release mechanism for the spring motor;

Fig. 7, a detail in side elevation of the circuit controller for the rewinding electric motor;

Fig. 8, a detail of a portion of the controller shown in Fig. 7;

Fig. 9, a section on the line 9—9, Fig. 7;

Fig. 10, a detail of the gearing connecting the synchronous motor with the time dial, and Fig. 11, a detail of the gearing connecting the rewinding electric motor with the spring motor.

In the present instance the invention is shown in a time switch for controlling an electric circuit, and whose movable contact member, not shown, is operatively connected with a reciprocating bar 10, which represents the movable contact member.

The reciprocating bar 10 is designed to be intermittently operated by a mechanical motor, shown as a spring motor 12 located in a barrel 13 (see Figs. 2 and 9) to which the outer end of the spring motor is fastened as by the bolt 14 or otherwise. The spring barrel 13 is mounted to revolve on the hollow hub 15 of a gear 16, which forms a closure member for one end of the spring barrel, whose other end is closed by a gear 17 affixed to the barrel to rotate therewith.

The inner end of the spring motor 12 is fastened to the hollow hub 15 by a screw 18 or otherwise.

The gear 16 and its hub 15 are mounted to revolve on a shaft 20 rotatably supported at its opposite ends in plates 21, 22 forming part of the framework of the apparatus and which will be hereinafter referred to as the front and back plates.

The barrel gear 17 is geared to the reciprocating bar 10 by a pinion 23 on a shaft 24, having fast thereon a gear 25 and a counter-weighted disk 26 to which the reciprocating bar 10 is pivotally connected, so that on one half revolution of the disk 26, the bar 10 will be moved in the direction of the arrow 28 to close the switch, and on the next half revolution said bar will be moved in the opposite direction to open the switch.

Provision is made for intermittently winding up the inner end of the spring motor 12 so as to maintain the latter in condition to effectively operate the switch indefinitely.

To this end the gear 16 is connected with the armature shaft 30 of an electric motor 31, which will be hereinafter referred to as the rewinding motor.

In the present instance the gear 16 meshes with a pinion 32 on a shaft 33 suitably supported by the framework and provided with a gear 34 which meshes with a pinion 35 (see Fig. 11) on a shaft 36 provided with a worm gear 37 which meshes with a worm 38 on the armature shaft 30.

It will thus be seen that the spring motor 12 is wound up and supplied with energy by the electric motor 31, and this energy is utilized in opening and closing the switch member represented by the reciprocating bar 10.

Provision is made for intermittently operating the switch member 10 at selected or predetermined intervals of time. To this end means are provided for holding stationary the switch member 10 and the spring barrel 13, and for releasing the same at predetermined intervals of time.

For this purpose the gear 25 meshes with a gear or pinion 40 mounted on a shaft 41, (see Figs. 4 and 5) supported by the back plate 22 and having mounted thereon a disk 42 connected with the gear 40 to revolve therewith and to have a limited movement independently thereof by springs 43 attached at one end to studs 44 on the gear 40 and at their other ends to studs 45 affixed to the disk 42 and extended through and movable in slots 46 in the gear 40.

An arm 47 on the disk 42 abuts against the end of a holding pawl or lever 48, which is connected by a link 49 with an oscillating disk 50, which latter is also connected by a link 51 with a second lever 52, with which the arm 47 engages when the pawl or lever 48 is lifted out of engagement with the arm 47 by the rotation of the disk 50 in the direction of the arrow 54, Fig. 5.

The rotation of the disk 50 in the direction of the arrow 54 lowers the lever 52 into the path of the arm 47 to arrest the latter shortly after the pawl or lever 48 has been disengaged from the arm 47.

The lever 52 is then lifted out of the path of the arm 47 by the return movement of the disk 50 in the direction opposite to that indicated by the arrow 54, and the lever or pawl 48 is lowered into the path of the arm 47. The gear or pinion 40 makes a complete revolution and is arrested by the pawl 48, and said gear or pinion is proportioned to the gear 25, so that the latter makes a half revolution for each complete revolution of the gear or pinion 40.

The disk 50 is fast on a shaft 56 extended through the back plate 22 and also through the front plate 21 and is rotated in the direction opposite to that indicated by the arrow 54 by a spring 57.

The shaft 56 is provided at its front end with a crank or arm 58 having a substantially V-shaped stud 59 (see Fig. 1) with which co-operates tripping dogs or arms 60, 61 carried by a time element or dial 62 mounted on the shaft 20 to rotate therewith and provided with graduations indicative of hours and subdivisions thereof.

The tripping dogs or arms 60, 61 are designed to be adjusted on the dial 62 into different positions, and to be secured in fixed relation to the dial in their adjusted positions. This may be accomplished as herein shown by fingers 63 on the arms 60, 61 being extended into radial slots 64 in the time dial 62.

The tripping dogs or arms 60, 61 are extended beyond the circumference of the time dial and provided with inclined or cam surfaces 65, which are designed to be engaged with the stud 59 on the arm 58 by the revolution of the time dial so as to rock the shaft 56 in the direction of the arrow 54, Fig. 5, and release the gear 40 and permit the spring motor 12 to move the switch member 10 so as to open or close the switch according to which position the switch member is in when the shaft 56 is rocked by one of the tripping dogs.

In the present instance the time dial 62 is provided with a hub 67 (see Fig. 9), which is extended over the front end of the shaft 20 and clamped against an annular flange or shoulder 68 thereon, and the tripping dogs 60, 61 are clamped against the time dial by a thumb screw 69 whose shank engages a threaded socket 70 in the end of the shaft 20.

By loosening the thumb screw 69 the tripping dogs 60, 61 are freed so that they can be adjusted into any desired position on the time dial to cause the switch to be operated at any desired or predetermined time or times.

In Fig. 1 the tripping dog 60 registers with the slot 64 indicative of 5:00 p. m. and the tripping dog 61 registers with the slot indicative of 6:30 a. m.

As thus arranged, the tripping dog 60 would cause the switch member 10 to be moved into one position, as, for instance, into its closed position at 5:00 p. m. and the tripping dog 61 would cause it to be moved into its open position at 6:30 a. m.

Provision is made for rotating said time dial 62 by a relatively small synchronous electric motor 72, and for establishing a definite time relation between it and said time dial, whereby the time dial is accurately driven or rotated in synchronism with standard time.

To this end the synchronous electric motor 72 has its armature shaft 73 provided with a worm 74 (see Figs. 2, 3 and 10), which engages and drives a worm gear 75 on a shaft 76 provided with a worm 77 which engages and drives a worm gear 78 on the shaft 20.

The worm gear 78 is preferably frictionally secured to the shaft 20 by a spring disk 79 on the shaft 20 forcing the worm gear against the annular flange 68 on said shaft 20 (see Fig. 9).

This frictional engagement of the worm gear 78 permits the time dial and its shaft 20 to be turned independently of the worm gear 78 to adjust the time dial with relation to the correct time represented by a standard clock, not shown.

The gearing between the time dial shaft 20 and the synchronous motor 72 is such that the time dial will make one complete revolution in 24 hours, and in the present instance with the two sets of worms 74, 77 and worm gears 75, 78 herein shown, the time dial 62 is revolved once in 24 hours by a synchronous motor whose rotor makes 1440 revolutions per 24 hours.

The synchronous motor 72 may and preferably will be of the self-starting type of known construction and is designed to be connected in an electric circuit in which flows an alternating current whose frequency is accurately controlled and maintained, as now commonly practised in large cities.

The spring motor 12 is intermittently rewound by the electric motor 31 and for this purpose the circuit of the latter is governed by a circuit controller, whose operation is governed by the condition of the spring motor, so that when the latter has run down to a predetermined point, the circuit controller will be operated to close the circuit of the electric motor 31 and when the spring motor has been rewound to a predetermined point, the circuit controller will be operated to open the circuit of the electric motor 31.

In the present instance 80 represents conventionally a circuit controller suitable for this purpose, which is of known or standard construction, and whose movable contact member is represented by the rod 81 (see Fig. 7).

The rod 81 is reciprocated by a lever 82 pivoted to a stud 83 on the front plate 21. The lever 82 has one end extended into a slot in a head 84 attached to the rod 81, and has its other end extended into a slot in a like head 85 attached to the end of an elongated hub 86 on a relatively wide pinion 87, which is in threaded engagement with a screw-threaded shaft 88 provided with a pinion 89 which meshes with and and is driven by the gear 17 attached to the spring motor barrel 13, so that when the gear 17 is rotated by the unwinding of the outer end of the spring motor 12, the pinion 89 and the screw-shaft 88 are rotated, and the latter effects movement of the pinion 87 lengthwise of the screw-shaft in the direction of the arrow 90 in Fig. 7. The pinion 87 is moved at each operation of the switch member 10 by the unwinding of the outer end of the spring motor. As the pinion 87 is intermittently moved in the direction of the arrow 90, its hub 86 moves with it and turns the lever 82 so as to ultimately close the circuit controller 80 when the pinion 87 has been moved in the direction of the arrow 90 a predetermined distance, at which time the spring motor 12 has been run down a predetermined amount.

When the circuit controller 80 has been thus closed, the electric motor 31 is cut into its circuit and the inner end of the spring motor 12 is rewound as above described.

As the spring motor is being rewound, the pinion 87 is rotated by the electric motor 31 and caused to turn on the screw-shaft 88 and to move lengthwise thereon continuously in the direction opposite to that indicated by the arrow 90, until the spring motor has been rewound the desired amount, whereupon the circuit of the electric motor 31 is opened by the lever 82 which is moved by the pinion 87 into substantially the position shown in Fig. 7.

The slots in the heads 84, 85 are preferably provided with curved end walls, after the manner represented in Fig. 8, to facilitate movement of the lever 82.

From the above description, it will be observed that the spring motor 12 unwinds at one end and operates the movable switch member 10 and also rotates the screw-shaft 88 to cut in the electric motor 31 when the spring motor 12 has been unwound a predetermined amount, and that while one end of the spring motor is being unwound the other end is held stationary by its connection with the rewinding electric motor 31, which at such time is idle.

It will also be observed that when the rewinding motor 31 is in operation, the inner end of the spring motor is wound up and the pinion 87 is rotated to open the circuit of the rewinding motor when the spring motor has been rewound the desired amount.

It will further be observed that the spring motor can function to operate the switch member 10 while it is being rewound.

It will thus be observed that the power of the spring motor does not depend upon the synchronous motor, and as a result the spring motor can be made of such size and provided with such strength as to operate the movable member 10 of a circuit controller capable of being used in circuits carrying currents of substantial amperage, as, for instance, 100 amperes, and that such circuit controller may be used in circuits carrying currents of any amount less than the maximum equally as well.

It will also be observed that the work required of the synchronous motor 72 is relatively light as it is only required to rotate the time dial and effect the tripping or release of the spring motor, consequently a small synchronous motor may be used and the apparatus can thereby be made compact.

Furthermore by means of the worms 74, 77 and worm gears 75, 78, the synchronous electric motor 72 is connected with the time element or dial 62 in a simple and efficient manner and at a minimum expense.

The bar 10 has been described as connected to the movable member of a switch for controlling an electric circuit, but it is not desired to limit the invention in this respect, as said bar may be operatively connected with a valve for controlling the flow of gas, water, or other fluids or connected to any other device which it is desired to operate intermittently, and by the term "switch member" as used in the claims, it is desired to include such devices or members.

The disk 50 is limited in its movements by a pin 100 carried by it and movable between studs 101, 102 on the back plate 22 (see Fig. 6).

The rock shaft 56 is provided with a second crank or arm 104 (see Fig. 1), which may be depressed by the operator to manually release the holding pawl 48 and thereby permit the spring motor to operate the switch member.

One embodiment of the invention is herein shown but it is not desired to limit the invention to the particular construction shown.

What is claimed is:

1. In combination, a switch member, a spring motor, gearing connecting one end of the spring motor with the switch member, an electric motor for intermittently rewinding the other end of said spring motor, gearing connecting the said electric motor with said spring motor, a circuit controller for said electric motor operatively connected with said spring motor and responsive to the condition of the latter to render the electric motor active, a second electric motor of less power than said spring motor, a time element, gearing connecting said time element with said second electric motor to establish a definite relation between said time element and said second electric motor, and means actuated by said time element for releasing said spring motor and permit it to operate said switch member at predetermined times.

2. In combination, a spring motor, a switch member intermittently operated thereby, an electric motor operatively connected with said spring motor to intermittently rewind the same, a rotatable time element governing the operation of said switch member by said spring motor and inoperative upon the latter, and a second electric motor of less power than said spring motor for continuously rotating said time element without influencing said spring motor.

3. In combination, a spring motor, a switch member geared to one end of said spring motor to be operated by the unwinding of said end, an electric motor geared to the other end of said spring motor to wind up said other end, a circuit controller for said electric motor, means responsive to the unwinding and winding up of the spring motor for operating said circuit controller to energize and deenergize said electric motor, a time element, a second electric motor for rotating the time element, and means operated by said time element for releasing said spring motor to permit it to actuate said switch member.

4. In combination, a spring motor, a switch member geared to one end of said spring motor to be operated by the unwinding of said end, an electric motor geared to the other end of said spring motor to wind up said other end, a circuit controller for said electric motor, means responsive to the unwinding and winding up of the spring motor for operating said circuit controller to energize and deenergize said electric motor, a time element, a second electric motor geared with said time element to establish a definite time relation between said motor and said time element and to rotate the latter, and means actuated by said time element for releasing said spring motor to permit it to actuate said switch member.

5. In combination, a switch member, a spring motor having one end thereof connected with said switch member to operate it by the unwinding of said spring, an electric motor connected with the other end of the spring for rewinding it, a time element controlling the unwinding of said spring, a second electric motor for operating said time element, a circuit controller governing said rewinding electric motor and intermittently movable by the unwinding of said spring motor into position to close the circuit of the rewinding electric motor, and movable by the rewinding of the spring motor by the electric motor into another position to open the circuit of the latter.

6. In combination, a switch member, a spring motor having one end thereof connected with the said switch member to operate it intermittently by intermittent unwinding of said spring motor, an intermittently operated electric motor connected with the other end of the spring motor for intermittently winding up said other end, a continuously driven time element controlling the intermittent operation of the switch member by the intermittent unwinding of said spring motor, a second electric motor for driving the time element, and a circuit controller for said rewinding electric motor moved by the unwinding of said spring motor into one position and moved by the rewinding of said spring motor by said electric motor into another position.

7. In combination, a switch member, a spring motor having one end thereof connected with the said switch member to operate it intermittently by intermittent unwinding of said spring motor, an intermittently operated electric motor connected with the other end of the spring motor for intermittently winding up said other end, a rotatable time element controlling the operation of the switch member by said spring motor, a second electric motor geared to said time element to rotate the latter continuously, and a circuit controller for said rewinding electric motor intermittently operated by said spring motor and said rewinding electric motor while said time element is being continuously rotated by said second electric motor.

8. In combination, a spring motor, a spring barrel to which one end of the spring motor is secured, a gear attached to said spring barrel, a switch member operatively connected with said gear, a second gear having a hub to which the other end of the spring motor is connected, a shaft on which said spring barrel and gears are loosely mounted, an electric motor, gearing connecting said electric motor with said second gear to rotate the latter and wind up the end of the spring connected therewith, a circuit controller for said electric motor responsive to the condition of said spring motor, a time element mounted on said shaft, a second electric motor of less power than said spring motor, gearing connecting said shaft with said second electric motor in definite relation thereto, and means for permitting said shaft and time element to be manually rotated independently of said gearing.

9. In combination, a switch member, a relatively powerful spring motor for operating it, mechanism for holding said spring motor from operating said switch member, a rotatable time element for releasing said spring motor from its holding mechanism and permitting the spring motor to operate said switch member, and an electric motor of a power less than that required to operate the switch member and geared to said time element to rotate the latter continuously and effect release of said spring motor and thereby enable the spring motor of materially greater power than that of the electric motor to be employed to operate the switch member.

In testimony whereof, I have signed my name to this specification.

CARL E. SUNDBERG.